(12) United States Patent
Toyama et al.

(10) Patent No.: US 7,868,786 B2
(45) Date of Patent: Jan. 11, 2011

(54) PARSING LOCATION HISTORIES

(75) Inventors: Kentaro Toyama, Miami, FL (US);
Ramaswamy Hariharan, Irvine, CA (US); Ross G. Cutler, Duvall, WA (US); John R. Douceur, Bellevue, WA (US); Nuria M. Oliver, Seattle, WA (US); Eric K. Ringger, Issaquah, WA (US); Daniel C. Robbins, Seattle, WA (US); Matthew T. Uyttendaele, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1849 days.

(21) Appl. No.: 10/968,861

(22) Filed: Oct. 19, 2004

(65) Prior Publication Data
US 2006/0101377 A1 May 11, 2006

(51) Int. Cl.
*G08G 1/123* (2006.01)
(52) U.S. Cl. .................. 340/988; 340/992; 701/200
(58) Field of Classification Search ............... 340/988, 340/992; 701/200, 201; 703/2, 22
See application file for complete search history.

(56) References Cited

U.S. PATENT DOCUMENTS

| 6,222,482 | B1 | 4/2001 | Gueziec |
| 6,430,547 | B1 | 8/2002 | Busche et al. |
| 6,496,814 | B1 | 12/2002 | Busche |
| 6,505,106 | B1 | 1/2003 | Lawrence et al. |
| 6,615,133 | B2 | 9/2003 | Boies et al. |
| 6,751,626 | B2 * | 6/2004 | Brown et al. ................. 1/1 |
| 6,766,245 | B2 | 7/2004 | Padmanabhan |
| 7,398,157 | B2 * | 7/2008 | Sigurdsson et al. ......... 701/213 |

OTHER PUBLICATIONS

"Simulation of a Mobility Prediction Scheme Based on Neuro-Fuzzy Theory in Mobile Computing", Gil et al., Simulation, Jul. 2000, vol. 75, No. 1, pp. 6-17.
"Multidimensional Database Technology", Computer, Dec. 2001, vol. 34, No. 12, pp. 40-46.
"Data modeling of moving objects with GPS/GIS in Web Environment", Zhang et al., International conference on Communications, Circuits and Systems and West Sino Exposition Proceedings, 2002, vol. 2, pp. 1581-1585.

(Continued)

*Primary Examiner*—Toan N Pham
(74) *Attorney, Agent, or Firm*—Lee & Hayes, PLLC

(57) ABSTRACT

A location history is a collection of locations over time for an object. A stay is a single instance of an object spending some time in one place, and a destination is any place where one or more objects have experienced a stay. Location histories are parsed using stays and destinations. In a described implementation, each location of a location history is recorded as a spatial position and a corresponding time at which the spatial position is acquired. Stays are extracted from a location history by analyzing locations thereof with regard to a temporal threshold and a spatial threshold. Specifically, two or more locations are considered a stay if they exceed a minimum stay duration and are within a maximum roaming distance. Each stay includes a location, a starting time, and an ending time. Destinations are produced from the extracted stays using a clustering operation and a predetermined scaling factor.

37 Claims, 6 Drawing Sheets

OTHER PUBLICATIONS

"The cost model of moving objects communication with GPS", Zhang et al., International Conference on Communications, Circuits, and Systems and West Sino Exposition Proceedings, 2002, vol. 2, pp. 1576-1580.

"Modeling moving objects for location based services", Wolfson et al., Lectures notes in Computer Science, 2002, vol. 2538, pp. 46-58.

* cited by examiner

PARSING LOCATION HISTORIES

TECHNICAL FIELD

This disclosure relates in general to parsing location histories and in particular, by way of example but not limitation, to (i) extracting stays having a temporal component from location histories and/or (ii) producing destinations from stays.

BACKGROUND

Attaining positional information is becoming faster, easier, and cheaper. Furthermore, positional information may be repeatedly acquired and then collected and stored electronically. More specifically, geographic information systems (GIS) can produce what is called a location history. A location history is a record of an entity's location in geographical space over some interval of time.

Historically, location histories have been reconstructed by archaeologists and historians looking at migrating populations or census takers tracking demographics, at temporal resolutions of decades or centuries and spatial resolutions of tens or hundreds of kilometers. Recent advances in location-aware technology, however, allow the recording of location histories at a dramatically increased resolution. Examples of such location-aware technologies include the global positioning system (GPS), radio triangulation, localization via mobile phones and associated networks, interaction with IEEE 802.11 wireless systems, and monitoring of radio frequency identification (RFID) tags. These technologies make it feasible to track individual objects at resolutions of meters in space and seconds in time—in some cases, even greater resolution is possible.

These location-aware technologies along with modern computer storage capabilities enable a huge amount of positional data to be collected into a location history. The resulting location data points that are recorded for the location history can number in the hundreds, the thousands, the hundreds of thousands, or even higher. Unfortunately, although there are a few specific algorithms designed for certain particular applications of location histories, there are no general algorithms or approaches for organizing or otherwise handling this great wealth of location information.

Accordingly, there is a need for general schemes and/or techniques that can manipulate location histories, such as analyzing the location information thereof, modeling the location information thereof, and/or providing applications for using the analyzed or modeled location information.

SUMMARY

A location history is a collection of locations over time for an object. A stay is a single instance of an object spending some time in one place, and a destination is any place where one or more objects have experienced a stay. Location histories are parsed using stays and destinations. In a described implementation, each location of a location history is recorded as a spatial position and a corresponding time at which the spatial position is acquired. Stays are extracted from a location history by analyzing locations thereof with regard to a temporal threshold and a spatial threshold. Specifically, two or more locations are considered a stay if they exceed a minimum stay duration and are within a maximum roaming distance. Each stay includes a location, a starting time, and an ending time. Destinations are produced from the extracted stays using a clustering operation and a predetermined scaling factor. Applications for stays, destinations clustered from stays, and data structures thereof are also described.

Other method, system, approach, apparatus, device, media, procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction

A location history is a collection of locations over time for an object, including a person or group. Due to modern resolution and storage capabilities, location histories can have such a sheer volume and granularity of data that new possibilities for intricate analysis and data mining of a qualitatively different nature are now available. Generally, the following is described herein: generic data structures and algorithms for extracting interesting information from (e.g., high-resolution) location histories and some present applications of these analytical tools.

Each location of a location history is recorded as a geographic position and a corresponding time at which the geographic position is determined. The geographic position may be determined in any manner and using any denotation, as is described further herein below. A stay is a single instance of an object spending some time in one place. A destination is any place where one or more objects have experienced a stay.

These data and concepts are acquired, analyzed, etc. as described herein. First, the parsing of location histories is described qualitatively and then quantitatively in sections entitled "Parsing Location Histories Qualitatively" and "Parsing Location Histories Quantitatively". Second, applications of stays, applications of destinations resulting from stays, etc. are described in a section entitled "Applications with Location Histories".

Parsing Location Histories Qualitatively

Figure 1:
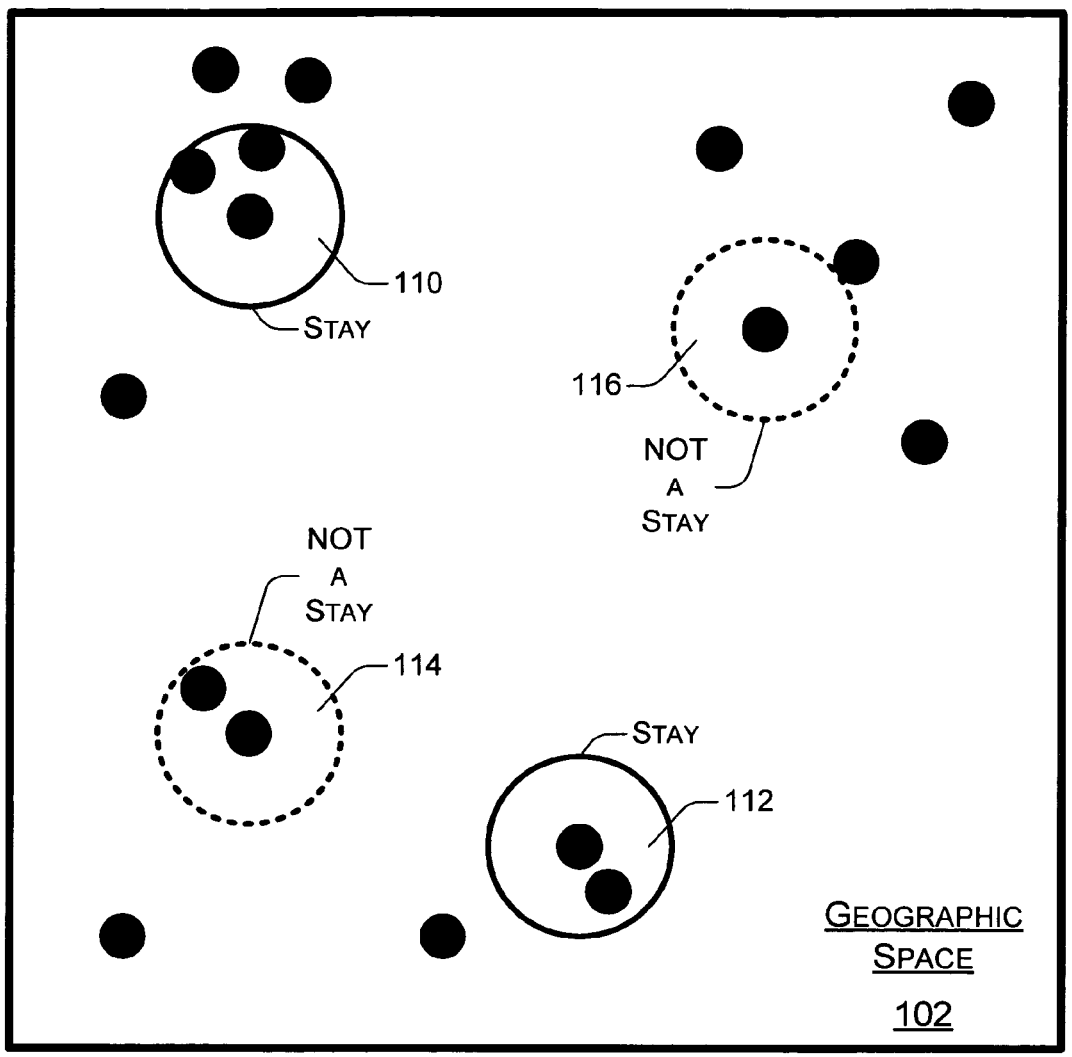
FIG. 1 shows a geographic space with multiple locations to illustrate an example of stays and non-stays.
Figure 1:
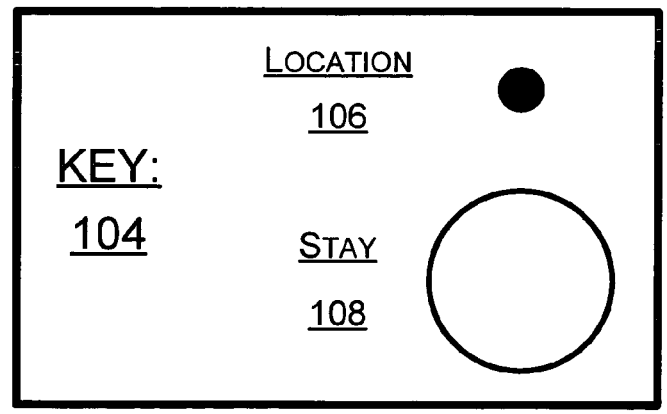

FIG. 1 shows a geographic space 102 with multiple locations 106 to illustrate an example of stays and non-stays. A key 104 indicates that smaller, solid circles represent locations 106. Key 104 also indicates that larger circles represent stays 108. Geographic space 102 includes multiple locations 106.

In a described implementation, each location 106 represents a position in geographic space 102 that has been recorded into a location history (which is not specifically indicated in FIG. 1). As illustrated at area 110, three locations 106 form a stay 108. At area 112, two locations 106 form a stay 108.

Thus, in the example of FIG. 1, two or more locations 106 may form a stay 108. At area 116, the single location 106 within the dashed circle does not form a stay. At area 114, the two locations 106 within the dashed circle also fail to form a stay 108.

The two locations 106 at area 114 do not form a stay 108 because there is a temporal component to stays 108. In other words, regardless of the relative proximity of the two locations 106 at area 114, the two locations 106 were not recorded in the location history sufficiently close in time so as to form a stay 108. Temporal and spatial components of stays 108 are described below with particular reference to FIG. 2.

Figure 2:
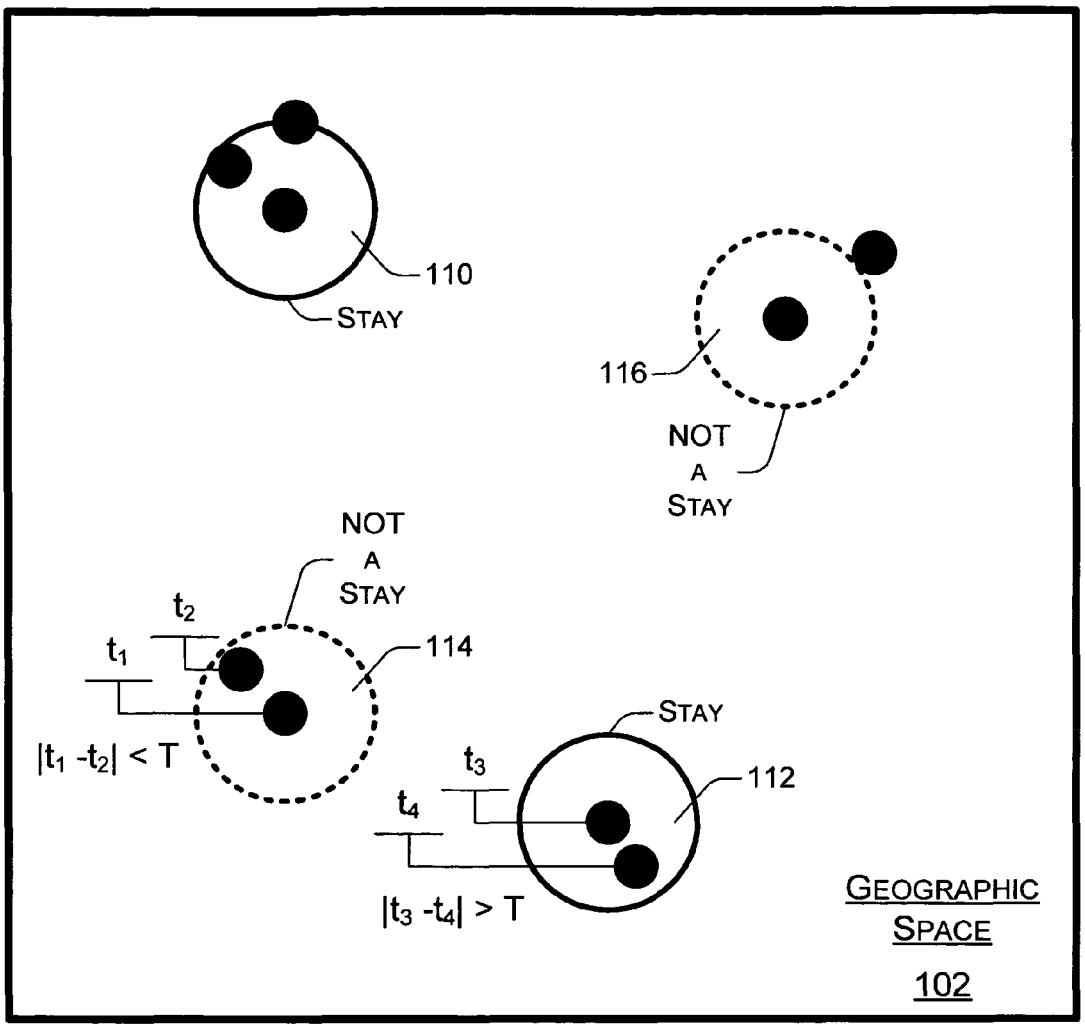
FIG. 2 shows the geographic space of FIG. 1 with multiple locations thereof and additional example indications illustrating temporal and spatial aspects of stays and non-stays.
Figure 2:
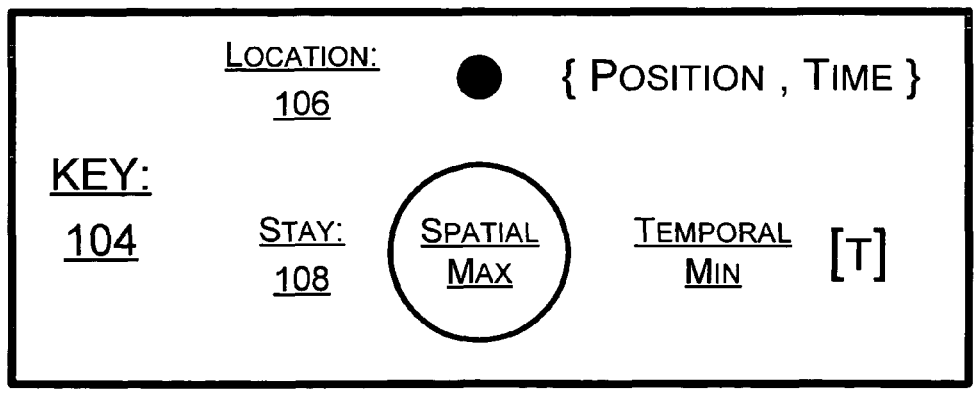

FIG. 2 shows the geographic space 102 of FIG. 1 with multiple locations 106 and additional example indications illustrating temporal and spatial aspects of stays and non-stays. In geographic space 102, locations 106 that are not relevant to areas 110, 112, 114, and 116 are omitted to improve clarity. Key 104 includes additional indications pertaining to locations 106 and stays 108.

As indicated at key 104, each location 106 from raw location data of a location history includes a position and a time ({position, time}). Additionally, each stay 108 is defined in terms of two thresholds: a spatial maximum (e.g., as indicated by the radius of the circle) and a temporal minimum ([T]). As illustrated the spatial maximum is expressed in terms of a radius or diameter, but other mechanisms may alternatively be employed.

For purposes of explanation, it is assumed that locations 106 at areas 110 and 116 exceed the temporal minimum T. At area 110, the three locations 106 thereat are within the spatial maximum, so these three locations 106 form a stay 108. On the other hand, at area 116 the two locations 106 thereat are not within the spatial maximum, so these two locations 106 do not form a stay 108.

For purposes of explanation, it is assumed (and depicted) that locations 106 at areas 112 and 114 are within the spatial maximum. At area 114, a first location 106 has a corresponding recording time of $t_1$, and a second location 106 has a corresponding time of $t_2$. Because $|t_1-t_2|$ is less than the temporal minimum T, the two locations 106 at area 114 do not qualify as a stay 108. At area 112, a third location 106 has a corresponding recording time of $t_3$, and a fourth location 106 has a corresponding time of $t_4$. Because $|t_3-t_4|$ is greater than (i.e., exceeds) the temporal minimum T, the two locations 106 at area 112 do qualify as a stay 108.

Figure 3:
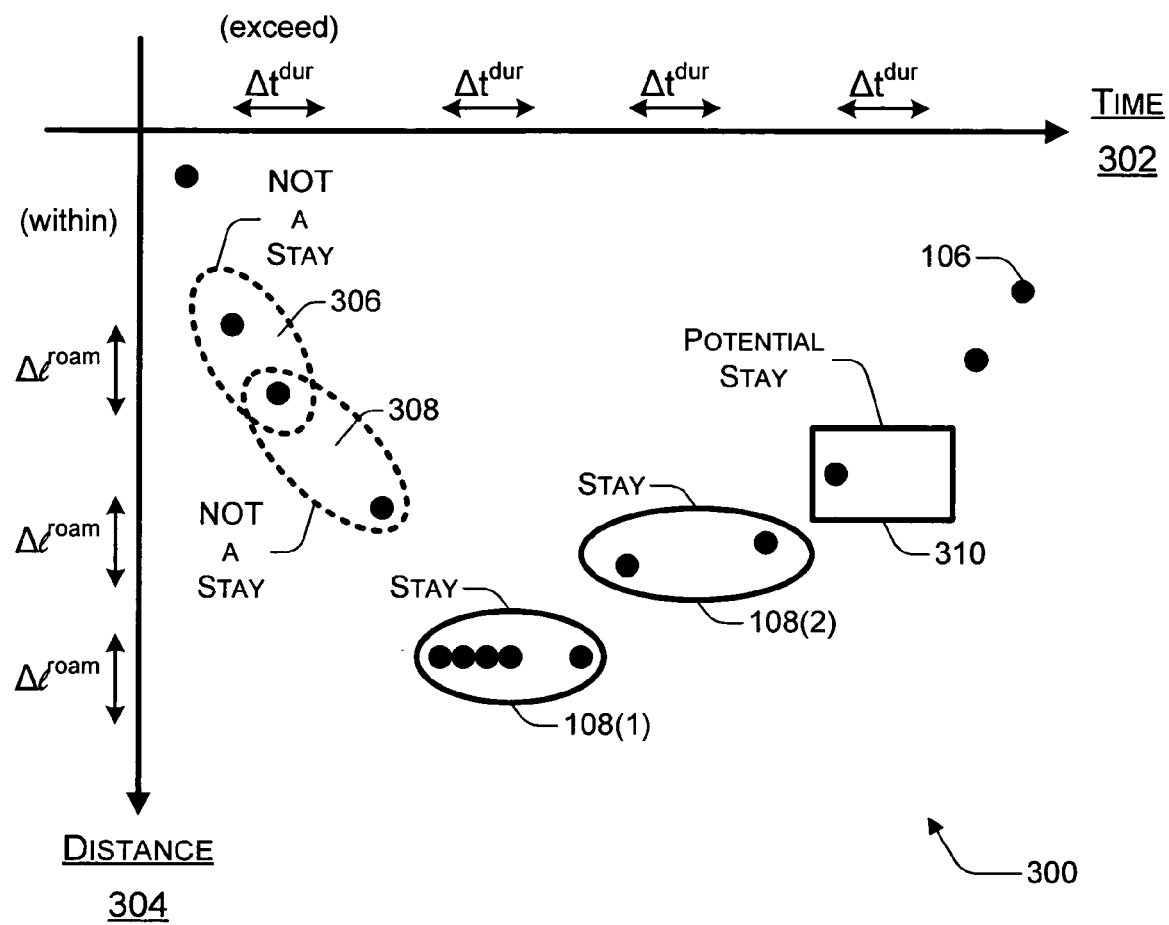
FIG. 3 is a graph of locations with respect to temporal and spatial axes to graphically illustrate an example of extracting stays from a location history.

FIG. 3 is a graph 300 of locations 106 with respect to a temporal or time axis 302 and a spatial or distance axis 304 to graphically illustrate an example of extracting stays 108 from a location history. As illustrated, a horizontal time axis 302 and a vertical distance axis 304 frame graph 300. Multiple locations 106 are plotted on graph 300 according to their respective positions in geographic space and corresponding recording times.

Each stay 108 is determined in accordance with a temporal minimum and a spatial maximum. For graph 300, the temporal minimum to be greater than is denoted as $\Delta t^{dur}$, and the spatial maximum to be less than is denoted as $\Delta l^{roam}$. Hence, two (or more) locations 106 can form a stay 108 if the temporal duration therebetween exceeds $\Delta t^{dur}$ and if a distance interval therebetween is within $\Delta l^{roam}$. The spatial maximum $\Delta l^{roam}$ may be considered the greatest distance an object is permitted to roam within a single stay 108.

Although the spatial maximum is illustrated as a two dimensional circle in the two-dimensional geographic space 102 of FIG. 2, the spatial maximum may be considered a one-dimensional distance (e.g., a radius of the circle); a maximum specified for other, non-Euclidean distance functions; or even a "soft" boundary where a parameter or parameters supplied to a function restricts the degree to which a set of locations may vary without specifying a hard threshold (e.g., the "maximum" threshold may be a threshold on the variance of a set of locations). Although not so illustrated, the spatial maximum is also applicable in a three dimensional geographic or other space, and it can be applied to any space in which a mathematical metric, or distance, function is available.

To extract stays 108 from a location history such as the locations 106 of graph 300, a sliding time window of a width equal to $\Delta t^{dur}$ is applied to the location history. In a described implementation, the time window starts at earlier locations 106 and is moved toward later locations 106 (e.g., with increasing time along time axis 302). At each current location 106, the next location 106 that exceeds the time window of width $\Delta t^{dur}$ is ascertained. This ascertained next location 106 may be considered a candidate location. If a distance between the current location 106 and such a next (candidate) location 106 is less than the roaming distance $\Delta l^{roam}$, then a stay 108 is determined and may be extracted. This effectively institutes a spatial roaming range that is applied to each candidate location that is ascertained using the sliding time window.

At area 306, the two locations 106 thereat fail to exceed the temporal minimum $\Delta t^{dur}$, so they do not form a stay 108, regardless of their spatial proximity. The sliding window is therefore moved forward in time to another new current location 106. At area 308, although the two locations 106 thereat do exceed the temporal minimum $\Delta t^{dur}$, they still do not form a stay 108 because the distance therebetween is greater than the roaming distance $\Delta l^{roam}$.

At stay 108(1), the five locations 106 thereat exceed the temporal minimum $\Delta t^{dur}$ and are within the spatial maximum $\Delta l^{roam}$, so they do form a stay 108. Likewise at stay 108(2), the two locations 106 thereat have a temporal difference that is greater than the sliding time window $\Delta t^{dur}$ and have a spatial distance that is less than the maximum roaming distance $\Delta l^{roam}$.

The location 106 at area 310 is termed a potential stay. In other words, depending on implementation, it may be counted as a stay 108 or not counted as a stay. Area 310 includes a current location 106 for analysis. The next location 106 does exceed the time window of width $\Delta t^{dur}$. However, there is insufficient information in the location history to determine whether the object of interest remained within the roaming distance $\Delta l^{roam}$ longer than the temporal minimum $\Delta t^{dur}$. Hence, individual implementations may elect to count area 310 as a stay 108 or to exclude area 310 and the location 106 thereof from the set of stays 108 being extracted from the location history of graph 300, possibly by incorporating other available information.

As described above, a sliding time window of a width equal to $\Delta t^{dur}$ is applied to the location history, and locations 106 are traversed from an earliest time to a latest time (e.g., with increasing time along time axis 302). However, the sliding time window may alternatively be applied to the location history with locations 106 being traversed from a latest time to an earliest time (e.g., with decreasing time along time axis 302). Moreover, the sliding window may be applied in both directions, with the resulting two sets of stays 108 being combined into a final set of stays 108 using an intersection or a union operation of the two sets of stays 108. Other alternatives for applying the time window may also be employed.

Figure 4:
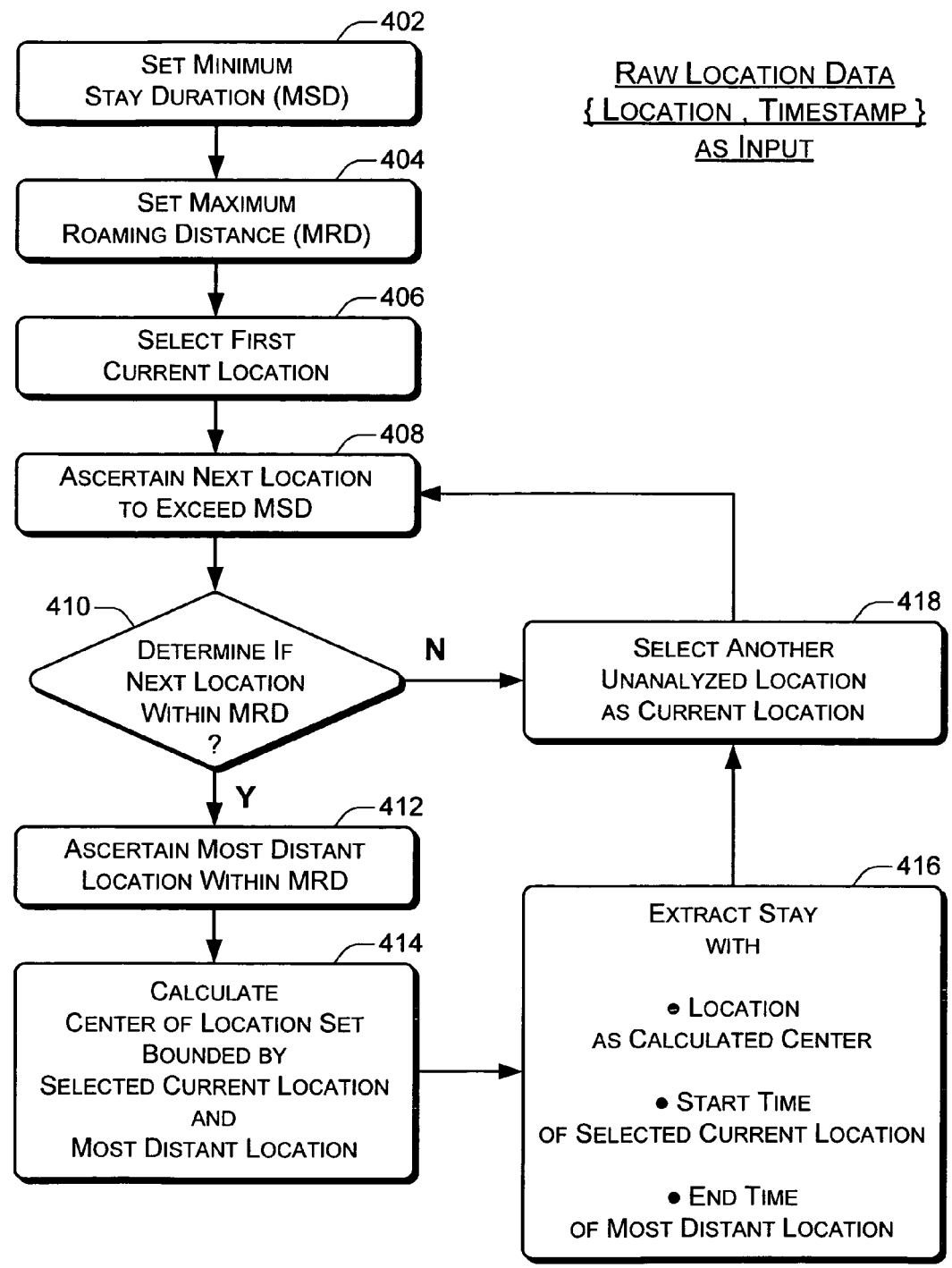
FIG. 4 is a flow diagram that illustrates an example of a method for extracting stays from a location history.

FIG. 4 is a flow diagram 400 that illustrates an example of a method for extracting stays from a location history. Flow diagram 400 includes nine (9) blocks 402-418. Although the actions of flow diagram 400 may be performed in other spaces and with a variety of location history data sets and/or stay threshold combinations, FIGS. 1-3 are used in particular to illustrate certain aspects and examples of the method. The method of flow diagram 400 is applied to a location history having raw location data with each data point thereof including a location and a timestamp.

At block 402, a minimum stay duration (MSD) is set or established. For example, a temporal minimum $\Delta t^{dur}$ may be established as the shortest period of time that an object is in one location in order to precipitate consideration as a stay 108. At block 404, a maximum roaming distance (MRD) is set or established. For example, a spatial maximum $\Delta l^{roam}$ may be established as the greatest distance that an object may roam during the temporal minimum time period $\Delta t^{dur}$ and still be considered a stay 108.

At block 406, a first current location for consideration as a stay is selected. For example, an earliest-recorded location 106 or a latest recorded location 106 may be selected as the first current location to be considered as part of a stay. At block 408, a next location that exceeds the minimum stay duration is ascertained. For example, from a temporal perspective, the next earliest or the next latest recorded location 106, respectively, that is sufficiently later or earlier than the current location 106 so as to exceed the minimum stay duration (e.g., to have a temporal difference greater than $\Delta t^{dur}$) is ascertained. This next candidate location to exceed the minimum stay duration might be chronologically the next location in the location history or there might be several intervening locations that do not exceed the minimum stay duration.

At block 410, it is determined if this next location is within the maximum roaming distance. For example, it may be determined if the distance between the current location 106 and the next location 106 (that exceeds the minimum stay duration with respect to the current location) is less than the maximum roaming distance $\Delta l^{roam}$. If not, then at block 418 another unanalyzed location is selected as the current location for consideration as part of a stay. At block 408, another or next candidate location that exceeds the minimum stay duration with respect to this new current location is ascertained.

On other hand, if it is determined (at block 410) that the next location is within the maximum roaming distance, then at block 412 the most temporally distant location that is within the maximum roaming distance is ascertained. For example, for stay 108(1) in FIG. 3, the rightmost location 106 along time axis 302 within stay 108(1) is the most temporally distant location 106 having a roaming distance that is less than $\Delta l^{roam}$. The current location and the ascertained most distant location, along with any temporally intervening locations, form a location set. This location set includes the next location as ascertained at block 408; this next location is also the most distant location for a two-location location set that is being extracted as a stay 108.

At block 414, a center of a location set bounded by the selected current location and the most distant location is calculated. This center may be determined in any of many possible manners, as possibly dependent on the geographic space and/or the data contents of the location history. For example, if a true Euclidean geometric space is involved, the actual geometric center may be determined. However, if physical street addresses are involved, it may be advisable to select one of the locations in the location set as the best available center to insure that the calculated center is translatable back into the street addresses of the geographic space being used. A medoid center example to this effect is described further herein below in the "Parsing Location Histories Quantitatively" section.

At block 416, a stay is extracted from the raw location data wherein the stay has a location of the calculated center, a start time of the selected current location, and an end time of the most distant location. Hence, in a described implementation, a stay 108 includes three assigned values: a location, a start time, and an end time. For example, the location of the extracted stay is set equal to the center as calculated at block 414, the start time is set equal to the time corresponding to the selected current location 106, and the end time is set equal to the time corresponding to when the most distant location 106 is recorded. The assignments of the start time and the end time are reversed if the sliding window is applied in reverse chronological order (e.g., from the latest location 106 and moved toward earlier locations 106).

Figure 5:
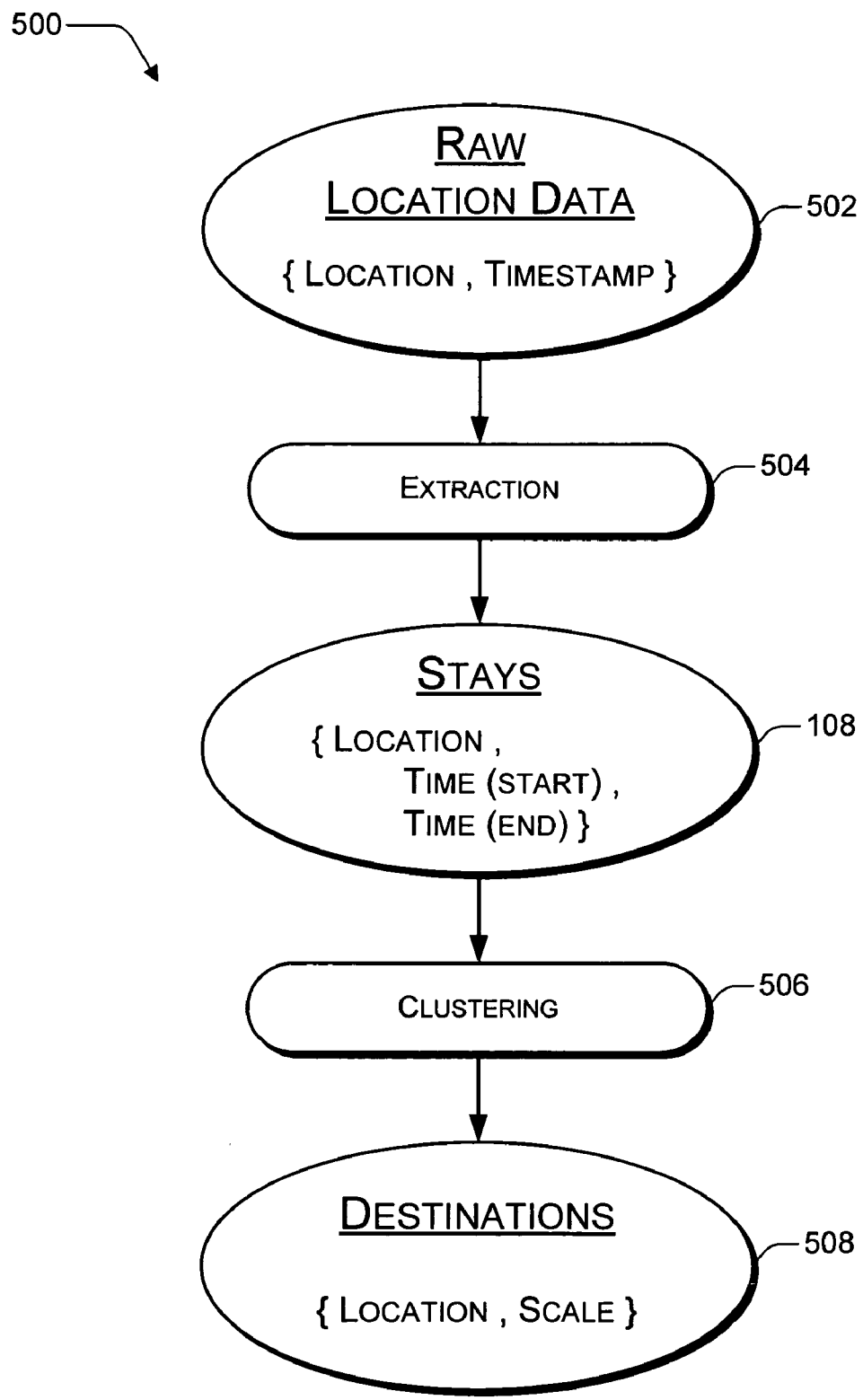
FIG. 5 is a flow diagram that illustrates an example progression from raw location data to destinations via extracted stays.

FIG. 5 is a flow diagram 500 that illustrates an example progression from raw location data 502 to destinations 508 via extracted stays 108. A location history 502 has raw location data with each location data point comprised of a spatial location and a timestamp ({location, timestamp}). The timestamp corresponds to a time at which the location of an object was acquired (e.g., measured, retrieved, calculated, etc.).

In a described implementation, an extraction operation 504 is applied to raw location data 502 to produce stays 108. Each stay 108 of a set of extracted stays comprises a location, a starting time, and an ending time. The location of a stay 108 is assigned responsive to a center calculated from a set of locations forming the extracted stay 108. The timestamp of the earliest location 106 of the set of locations is assigned to the starting time of the extracted stay 108, and the timestamp of the latest location 106 of the set of locations is assigned to the ending time of the extracted stay 108.

As described qualitatively above, each stay 108 is extracted from location history 502 using a temporal parameter or threshold. For example, a minimum stay duration is enforced for two or more locations to qualify as a stay 108 (and possibly for one location to qualify in the case of potential stays 310). Each stay 108 is thus associated with a temporal aspect inasmuch as they are extracted from raw location data 502 using a minimum temporal threshold. Furthermore, each stay 108 corresponds to a time period as represented by its starting time and ending time.

A clustering operation 506 is applied to extracted stays 108 to produce destinations 508. Clustering operation 506 utilizes a scaling factor to cluster stays 108 into destinations 508 of a desired spatial resolution. Each destination 508 comprises a location and a scale in accordance with clustering operation 506 was performed. An example clustering operation 506 is described further herein below in the section entitled "Parsing Location Histories Quantitatively" in a subsection entitled "Destinations".

Parsing Location Histories Quantitatively

This section describes an implementation of the parsing of location histories from a quantitative perspective. However, the parsing of location histories as described herein is not limited to the specific quantitative implementation described in this section.

Notation

Raw location data is given to be represented as follows: data comprises a timestamp and a point location. A body of raw data is therefore a set, $\mathcal{R}=\{r_i\}$, comprising pairs, $r_i=(t_i,l_i)$, each containing a timestamp and a location. Without loss of generality, it is assumed that the data is labeled such that $1 \leq i \leq R$ (where $R=|\mathcal{R}|$) and is sorted in time order: $r_i < r_j$ if $t_i < t_j$, for any i and j.

Locations are defined generally. For example, locations may be any identifier which identifies a single, unique, geographic point location—n-tuple of real values are probably the most typical, but alternate representations, such as a text label, are possible. However, the locations do exist in a metric space. In other words, there is a metric function, Distance($l_i$, $l_j$), which computes the distance between two locations, and which satisfies the criteria of a true mathematical metric. This three-part criteria entails that the function is (1) positive definite: Distance($l_i,l_j$)$\geq$0 for any $l_i$, $l_j$; (2) Distance($l_i,l_j$)=0, if and only if $l_i$ and $l_j$ represent the same location; and (3) the triangle inequality holds: Distance($l_i,l_j$)+Distance($l_j,l_k$)$\geq$Distance($l_i,l_k$). Although the specific data structures and algorithms described in this section build upon this metric function, they are not dependent on how location is represented, per se.

Terminology

In order to analyze location histories, raw location data are parsed to extract symbols that approximate intuitive semantic notions of location. In particular, the following four concepts are considered intuitively meaningful (the word place is meant to imply a neighborhood around a point location):

A "stay" is a single instance of an object spending some time in one place.

A "destination" is any place where one or more objects have experienced a stay.

For example, four hours spent at the office today could be a single stay. The office itself would then be a destination. Destinations can be thought of as "timeless" generalizations of stays.

In the subsections that follow, example rigorous definitions of stays and destinations, as well as algorithms for extracting them from a location history are presented. The approach is data-driven using variations of clustering algorithms; destinations are defined independent of a priori information about likely destinations. In particular, correlating stays and destinations with geographic entities defined by an existing map or GIS is not directly addressed herein, although the approach does not preclude associations of stays and destinations with geographic entities in a GIS. Instead, the focus is more on destinations that appear naturally in the location history data itself. After applying the general approach described herein, it is relatively straightforward to associate data-driven destinations post hoc with existing geographical entities, if desired.

Stays

A stay is characterized by spending some time in one place. This concept is captured rigorously while still maintaining breadth to encompass the semantic intuition. By way of example, it is possible that a five-minute visit to the restroom, a half-day lounge at the beach, and a one-week vacation in Hawaii all represent different stays, even though they might all occur within the same two-week time interval. This type of nested or overlapping structure happens throughout a given object's location history, and it is created by scale; hence, stays can occur at various geographic and temporal scales. Stays at one scale might be relevant for some applications, but not for others. A hierarchical nesting of scales might be useful for yet other applications.

Regardless, these examples show that the extraction of stays from a location history is dependent on two scale parameters, one each for time and space. These parameters are called the stay duration and the roaming distance. The roaming distance, $\Delta l^{roam}$, represents the maximum distance that an object can stray from a point location to count as a stay. A stay duration, $\Delta t^{dur}$, is the minimum duration an object can stay within the roaming distance of a point to qualify as staying at that location. These parameters can be set according to the needs of a given application, or the algorithm can be run multiple times with increasing scale values to create a hierarchy of stays.

A single stay is characterized by a location vector, a start time, and an end time: $s_i=(l_i,t_i^{start},t_i^{end})$. The algorithm described herein, which recovers a set of stays, $S=\{s_i\}$, from the raw data is given in Table 1 below. The functions Medoid($\mathcal{R}$,i,j) and Diameter($\mathcal{R}$,i,j) are computed over the set of locations represented in the set of raw data $\{r_k : r_k \in \mathcal{R}\}$, for $i \leq k < j$. The Diameter function computes the greatest distance between any two locations in a set. The Medoid function identifies the location in a set that minimizes the maximum distance to every other point in the set (i.e., it is the data point nearest to the "center" of the data point set). The algorithm essentially identifies contiguous sequences of raw data points that remain within the roaming distance for at least as long as the stay duration.

TABLE 1

Algorithm for extracting stays from raw data.

Input: raw location history, $\mathcal{R} = \{r_i\}$
Output: a set of stays, $S = \{s_i\}$
Initialize: i ← 1, S ← ∅
while i < R
    j* ← minimum j s.t. $r_j \geq r_i + \Delta t_{dur}$
    if (Diameter( $\mathcal{R}$,i,j* ) > $\Delta l_{roam}$ )
        i ← i + 1
    else
begin
        j* ← maximum j s.t. Diameter( $\mathcal{R}$,i,j ) <= $\Delta l_{roam}$
        S ← S ∪ (Medoid( $\mathcal{R}$,i,j* ),$t_i,t_{j*}$)
        i ← j* +1
    end
end In the worst case, the algorithm is an $O(n^2)$ algorithm for n data points because medoid and diameter computations require distance computations between all pairs in a stay grouping. In practice, however, stay groupings over which these computations take place are far smaller than n, and performance is effectively O(n). Many of the problems of clustering unordered points are avoided because of the temporally ordered nature of the original raw location data.

Destinations

A destination is any place where one or more tracked objects have experienced a stay. Destinations are dependent on geographic scale, but not on temporal scale (that is, beyond the temporal scales used to identify stays). The scale determines how close two point locations can be and still be considered part of the same destination. As with stays, the scale of a destination is dependent on the intended usage, and so it is a parameter that is set explicitly. For example, a scale representing ~3 meters might be appropriate for extracting destinations corresponding to offices in a building, but a scale of ~100 m would be necessary for identifying whole buildings as destinations.

Aly*

Given a set of locations, Aly*꞊꞊ ב ℛ £={$l_i$}, the goal is to

Aly* extract the destinations Aly*꞊꞊ ב ℛ £ 𝒟={$d_j$} at a particular geographic scale $\Delta l^{dest}$. Each destination is represented by a location and the scale used: $d_j=(l_j,\Delta l_j^{dest})$.

Determining destinations from a set of location vectors is a clustering task. There are many options for clustering points, ranging from k-means clustering to hierarchical clustering techniques and so forth. A type of agglomerative clustering is applied herein because it allows specification of the spatial scale of the clusters, rather than the number of clusters or the number of points contributing to a cluster, neither of which are known a priori.

A cluster is characterized by a set of point locations: c={1}. The clusters are initialized by assigning each input point location of each stay to a cluster; consequently, there are as many clusters as stay location points at the beginning of the algorithm. During each iteration of the algorithm, the two closest clusters are identified. If a cluster resulting from merging the two clusters would be within the specified scale, $\Delta l^{dest}$, then the two clusters are merged. Otherwise, the algorithm ceases and outputs all remaining clusters as destinations. This is an $O(m^2)$ algorithm for m stays because of the computation of distances between all pairs of stays.

Table 2 below shows pseudocode for this algorithm. The function FindClosestPair finds the closest two clusters from the cluster set, the function Radius computes the combined radius of the two clusters assuming that they are merged, and the function Merge combines two clusters into one. The Radius of a set of locations is the distance from the set's medoid to the location within the set that maximizes that distance.

For location history modeling, it is useful to define a function, d(l), that returns the nearest destination to location l. This function may be further extended to another function, d(l, $\Delta l^{dest}$), that returns a null value if the location is not within $\Delta l^{dest}$ of any known destination.

Destinations can also be computed hierarchically across scales by allowing the medoids of each cluster created at one scale, $\Delta l_j^{dest}$, to be used as input locations to compute destinations at a greater scale, $\Delta l_{j+1}^{dest}$.

TABLE 2

Algorithm for computing destinations.

Input: a set of point locations, $\mathcal{L} = \{l_i\}$
Output: a set of destinations, $\mathcal{D} = \{d_j\}$
Initialize: $c_i \leftarrow l_i$, for $1 \leq i \leq L$, and $\mathcal{C} = \{c_i\}$
loop
    $(c_i, c_j) \leftarrow$ FindClosestPair($\mathcal{C}$);
    if Radius($c_i, c_j$) $\leq \Delta l^{dest}$
        $c_i \leftarrow$ Merge($c_i, c_j$)
        $\mathcal{C} \leftarrow \mathcal{C} - c_j$
    else
        exit
end
foreach $c_i \in \mathcal{C}$, create destination $d_i =$ (Medoid($c_i$),$\Delta l^{dest}$)

Armed with data structures for stays and destinations, probabilistic models of location histories can be constructed.

Applications with Location Histories

Several examples of applications with location histories are provided in this section. These applications may be effectuated and/or implemented with raw location data, sets of stays, sets of destinations, and so forth.

Time-based patterns of behavior: One application of stays is to organize an object's stays over a given period of time into time- and destination-based "bins," and to do comparative analysis of the stays in different bins using (e.g., standard) statistical metrics. For example, an analysis of the mean duration, start time, end time, etc., of stays at a person's workplace (which can be extracted as a single destination from a person's location history) collated by day of the week is possible. The results can reveal working patterns for the person based on day of the week. Similar analysis can extend to stays collated by day of the month, hour of the day, month of the year, and so forth. Computing the variance, instead of the mean, of these bins can reveal how much variation there is for each category. Other straightforward statistical analyses are also possible.

Location modeling and fusion: Using stays, it is possible to construct a generative model of where the tracked object spends its time and when. Additional details regarding examples of location modeling are described in a related application entitled "Modeling Location Histories" and having at least one common inventor as well as a common assignee. This related application (Attorney's/Client's Docket No.: MS1-2157US/MS#309711.01), which is hereby incorporated by reference in its entirety herein, was assigned application number 10/968,862 and filed on Oct. 19, 2004. The model's estimates can be fused with other sources of information about the object's location to get a "best guess" as to its location.

Multi-object location interactions: Using sets of stays generated from more than one object's location history, information about when two or more objects were co-located is determinable. Other information that is readily revealed includes: the frequency of co-location between two or more objects, the average distance between objects, the percentage of time that two or more objects fall within a given range, time-dependent variations in these quantities, and so forth.

Destination statistics: Using sets of stays generated from more than one object, statistics about destination can be calculated. Such example statistics include: frequency that a destination receives visits, peak and idle times for a destination, mean and variance of length of stays at a destination, and so forth.

Scale-dependent pattern analysis: Both stays and destinations depend on time- and/or space-dependent parameters which effectively model the scale at which these entities exist. By extracting stays and destinations from a set of location histories at different temporal and spatial scales, analysis reveals the relative frequency of stays and destination at different scales, the relationships between stays and destination at different scales (e.g., a mean number of destinations at one scale subsumed by a single destination at a coarser scale), as well as the overall distribution of stays and destinations by scale (e.g., a regression analysis of the number of stays as the spatial scale changes). Other scale-dependent analyses may alternatively be undertaken.

The devices, actions, aspects, features, algorithms, procedures, modules, components, etc. of FIGS. 1-5 are illustrated in diagrams that are divided into multiple blocks. However, the order, interconnections, interrelationships, layout, etc. in which FIGS. 1-5 are described and/or shown is not intended to be construed as a limitation, and any number of the blocks can be modified, combined, rearranged, augmented, omitted, etc. in any manner to implement one or more systems, methods, devices, procedures, media, apparatuses, arrangements, etc. for parsing location histories. Furthermore, although the description herein includes references to specific implementations (including a general device of FIG. 6), the illustrated and/or described implementations can be implemented in any suitable hardware, software, firmware, or combination thereof and using any suitable raw location data format(s), stay and destination data structure(s), threshold value(s), clustering algorithm(s), geographic or geometric or other space(s), temporal analysis direction(s), and so forth.

Example Operating Environment for Computer or Other Device

Figure 6:
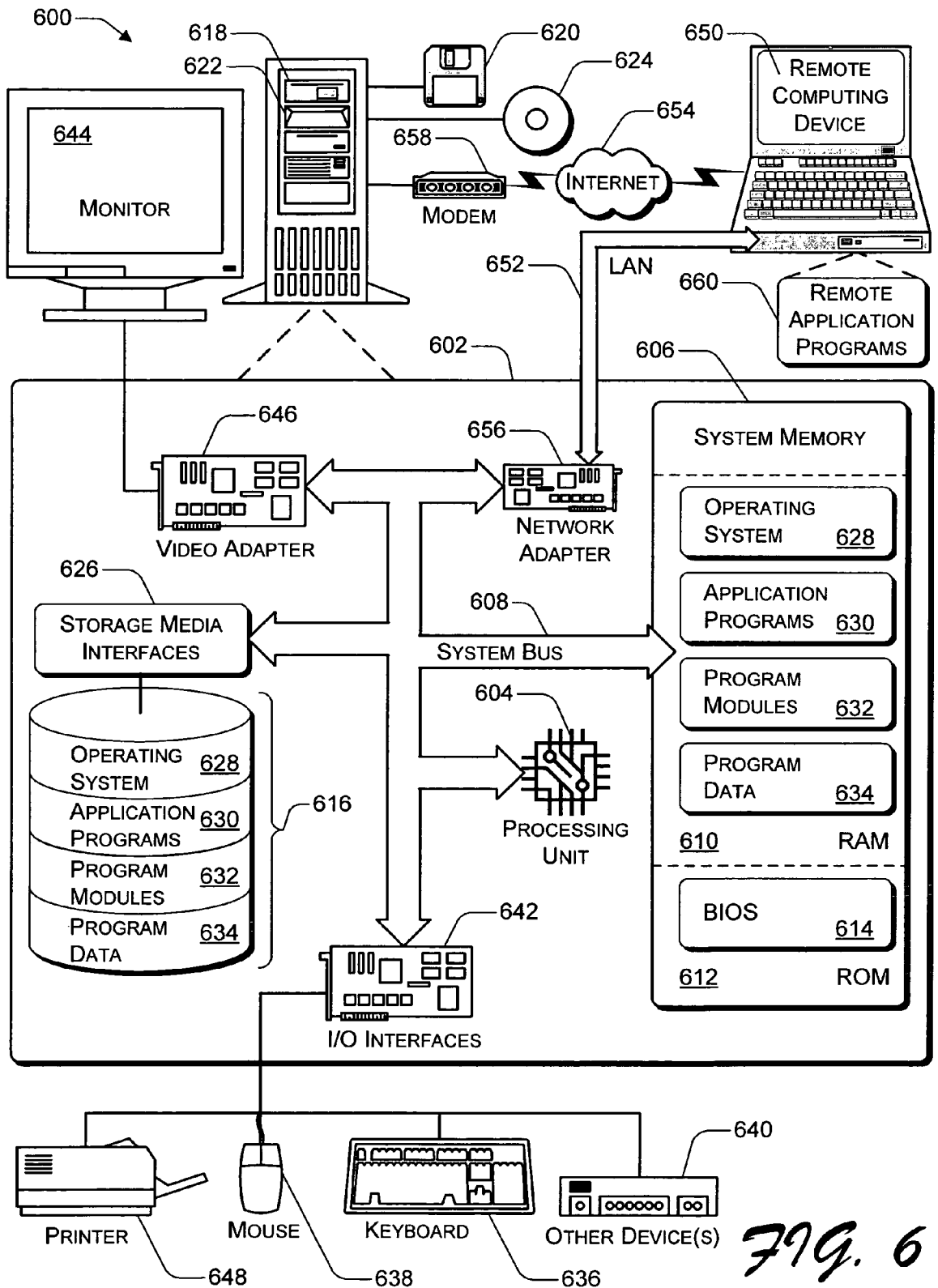
FIG. 6 illustrates an example of a computing (or general device) operating environment that is capable of (wholly or partially) implementing at least one aspect of parsing location histories as described herein.

FIG. 6 illustrates an example computing (or general device) operating environment 600 that is capable of (fully or partially) implementing at least one system, device, apparatus, component, arrangement, protocol, approach, method, procedure, media, API, some combination thereof, etc. for parsing location histories as described herein. Operating environment 600 may be utilized in the computer and network architectures described below.

Example operating environment 600 is only one example of an environment and is not intended to suggest any limitation as to the scope of use or functionality of the applicable device (including computer, network node, entertainment device, mobile appliance, general electronic device, etc.) architectures. Neither should operating environment 600 (or the devices thereof) be interpreted as having any dependency or requirement relating to any one or to any combination of components as illustrated in FIG. 6.

Additionally, location history parsing may be implemented with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, videoconferencing equipment, minicomputers, mainframe computers, network nodes, distributed or multi-processing computing environments that include any of the above systems or devices, some combination thereof, and so forth.

Implementations for parsing location histories may be described in the general context of processor-executable instructions. Generally, processor-executable instructions include routines, programs, protocols, objects, interfaces, components, data structures, etc. that perform and/or enable particular tasks and/or implement particular abstract data types. Parsing location histories, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Example operating environment 600 includes a general-purpose computing device in the form of a computer 602, which may comprise any (e.g., electronic) device with computing/processing capabilities. The components of computer 602 may include, but are not limited to, one or more processors or processing units 604, a system memory 606, and a system bus 608 that couples various system components including processor 604 to system memory 606.

Processors 604 are not limited by the materials from which they are formed or the processing mechanisms employed therein. For example, processors 604 may be comprised of semiconductor(s) and/or transistors (e.g., electronic integrated circuits (ICs)). In such a context, processor-executable instructions may be electronically-executable instructions. Alternatively, the mechanisms of or for processors 604, and thus of or for computer 602, may include, but are not limited to, quantum computing, optical computing, mechanical computing (e.g., using nanotechnology), and so forth.

System bus 608 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 602 typically includes a variety of processor-accessible media. Such media may be any available media that is accessible by computer 602 or another (e.g., electronic) device, and it includes both volatile and non-volatile media, removable and non-removable media, and storage and transmission media.

System memory 606 includes processor-accessible storage media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is typically stored in ROM 612. RAM 610 typically contains data and/or program modules/instructions that are immediately accessible to and/or being presently operated on by processing unit 604.

Computer 602 may also include other removable/non-removable and/or volatile/non-volatile storage media. By way of example, FIG. 6 illustrates a hard disk drive or disk drive array 616 for reading from and writing to a (typically) non-removable, non-volatile magnetic media (not separately shown); a magnetic disk drive 618 for reading from and writing to a (typically) removable, non-volatile magnetic disk 620 (e.g., a "floppy disk"); and an optical disk drive 622 for reading from and/or writing to a (typically) removable, non-volatile optical disk 624 such as a CD, DVD, or other optical media. Hard disk drive 616, magnetic disk drive 618, and optical disk drive 622 are each connected to system bus 608 by one or more storage media interfaces 626. Alternatively, hard disk, drive 616, magnetic disk drive 618, and optical disk drive 622 may be connected to system bus 608 by one or more other separate or combined interfaces (not shown).

The disk drives and their associated processor-accessible media provide non-volatile storage of processor-executable instructions, such as data structures, program modules, and other data for computer 602. Although example computer 602 illustrates a hard disk 616, a removable magnetic disk 620, and a removable optical disk 624, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the example operating environment 600.

Any number of program modules (or other units or sets of processor-executable instructions) may be stored on hard disk 616, magnetic disk 620, optical disk 624, ROM 612, and/or RAM 610, including by way of general example, an operating system 628, one or more application programs 630, other program modules 632, and program data 634. These processor-executable instructions may include, for example, one or more of a raw location history data structure, a stays and/or destinations data structure(s), a program/module that produces stays from a raw location history, a program/module that produces destinations from stays, and so forth.

A user may enter commands and/or information into computer 602 via input devices such as a keyboard 636 and a pointing device 638 (e.g., a "mouse"). Other input devices 640 (not shown specifically) may include a microphone, joystick, game pad, satellite dish, serial port, video camera, scanner, and/or the like. These and other input devices are connected to processing unit 604 via input/output interfaces 642 that are coupled to system bus 608. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 644 or other type of display device may also be connected to system bus 608 via an interface, such as a video adapter 646. Video adapter 646 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 644, other output peripheral devices may include components such as speakers (not shown) and a printer 648, which may be connected to computer 602 via input/output interfaces 642.

Computer 602 may operate in a networked environment using logical connections to one or more remote computers, such as a remote computing device 650. By way of example, remote computing device 650 may be a peripheral device, a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 650 is illustrated as a portable computer that may include many or all of the elements and features described herein with respect to computer 602.

Logical connections between computer 602 and remote computer 650 are depicted as a local area network (LAN) 652 and a general wide area network (WAN) 654. Such networking environments are commonplace in offices, enterprise-wide computer networks, intranets, the Internet, fixed and mobile telephone networks, ad-hoc and infrastructure wireless networks, mesh networks, other wireless networks, gaming networks, some combination thereof, and so forth. Such networks and logical and physical communications connections are additional examples of transmission media.

When implemented in a LAN networking environment, computer 602 is usually connected to LAN 652 via a network interface or adapter 656. When implemented in a WAN networking environment, computer 602 typically includes a modem 658 or other component for establishing communications over WAN 654. Modem 658, which may be internal or external to computer 602, may be connected to system bus 608 via input/output interfaces 642 or any other appropriate mechanism(s). It is to be appreciated that the illustrated network connections are examples and that other manners for establishing communication link(s) between computers 602 and 650 may be employed.

In a networked environment, such as that illustrated with operating environment 600, program modules or other instructions that are depicted relative to computer 602, or portions thereof, may be fully or partially stored in a remote media storage device. By way of example, remote application programs 660 reside on a memory component of remote computer 650 but may be usable or otherwise accessible via computer 602. Also, for purposes of illustration, application programs 630 and other processor-executable instructions such as operating system 628 are illustrated herein as discrete blocks, but it is recognized that such programs, components, and other instructions reside at various times in different storage components of computing device 602 (and/or remote computing device 650) and are executed by processor(s) 604 of computer 602 (and/or those of remote computing device 650).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

What is claimed is:

1. One or more processor-accessible storage media comprising processor-executable instructions that, when executed, direct a device to perform actions comprising:
   ascertaining a next location that exceeds a minimum stay duration with respect to a current location;
   determining if the next location is within a maximum roaming distance with respect to the current location;
   if the next location is determined to be within the maximum roaming distance, extracting a stay that is associated with the current location and the next location.

2. The one or more processor-accessible storage media as recited in claim 1, wherein the action of ascertaining comprises actions of:
   determining a difference between a timestamp corresponding to the current location and a timestamp corresponding to the next location; and
   determining if the difference is greater than the minimum stay duration.

3. The one or more processor-accessible storage media as recited in claim 1, wherein the action of determining comprises actions of:
   calculating a distance between the current location and the next location; and determining if the distance is less than the maximum roaming distance.

4. The one or more processor-accessible storage media as recited in claim 1, wherein the action of extracting comprises an action of:
   extracting the stay such that the stay is assigned (i) a location responsive to a center calculated from a set of locations that includes the current location and the next location and (ii) a start time responsive to a timestamp corresponding to the current location.

5. The one or more processor-accessible storage media as recited in claim 1, wherein the processor-executable instructions, when executed, direct the device to perform a further action comprising:
ascertaining a location that is temporally most distant from the current location but within the maximum roaming distance.

6. The one or more processor-accessible storage media as recited in claim 5, wherein the processor-executable instructions, when executed, direct the device to perform a further action comprising:
calculating a center of a location set that is bounded by the current location and the most distant location.

7. The one or more processor-accessible storage media as recited in claim 6, wherein the action of calculating comprises an action of:
calculating a geometric center of the location set; or
calculating a medoid center of the location set.

8. The one or more processor-accessible storage media as recited in claim 6, wherein the action of extracting comprises an action of:
extracting the stay such that the stay is assigned (i) a location responsive to the calculated center, (ii) a start time responsive to a timestamp corresponding to the current location, and (iii) an end time responsive to a timestamp corresponding to the most distant location.

9. The one or more processor-accessible storage media as recited in claim 1, wherein the processor-executable instructions, when executed, direct the device to perform further actions comprising:
accepting raw location data having multiple locations as input, the multiple locations including the current location and the next location; and
selecting the current location from the raw location data.

10. The one or more processor-accessible storage media as recited in claim 9, wherein each location of the multiple locations of the raw location data includes a spatial location and a timestamp.

11. The one or more processor-accessible storage media as recited in claim 9, wherein the processor-executable instructions, when executed, direct the device to perform further actions comprising:
extracting multiple stays from the multiple locations of the raw location data; and clustering the extracted multiple stays into multiple destinations III accordance with a selected scale.

12. The one or more processor-accessible storage media as recited in claim 11, wherein the processor-executable instructions, when executed, direct the device to perform a further action comprising:
effectuating and/or implementing an application using the multiple stays and/or the multiple destinations, the application selected from a group comprising: time-based patterns of behavior, location modeling and fusion, multi-object location interactions, destination statistics, and scale-dependent pattern analysis.

13. The one or more processor-accessible storage media as recited in claim 1, wherein the one or more processor-accessible media comprise at least one of (i) one or more storage media or (ii) one or more transmission media.

14. A device that is capable of accessing raw location data having multiple locations as input, each location of the multiple locations including a spatial location and a timestamp; the device adapted to extract multiple stays from the multiple locations based on a temporal minimum and responsive to a spatial maximum, wherein two locations of the multiple locations at least partially form a stay of the extracted multiple stays when the two locations comport with the temporal minimum and the spatial maximum.

15. The device as recited in claim 14, wherein each stay of the extracted multiple stays is defined by a spatial location, a start time, and an end time.

16. The device as recited in claim 14, wherein the two locations include a first location and a second location; the first location having a first spatial location and a first timestamp, and the second location having a second spatial location and a second timestamp; and wherein the first and second locations at least partially form a stay if a difference between the first timestamp and the second timestamp exceeds the temporal minimum and if a distance between the first spatial location and the second spatial location is within the spatial maximum.

17. The device as recited in claim 14, wherein at least one stay of the extracted multiple stays is formed from three or more locations of the multiple locations, the three or more locations forming the at least one stay comporting with the temporal minimum and the spatial maximum.

18. The device as recited in claim 17, wherein the device is further adapted to calculate a center of a location set including the three or more locations; and wherein the device is further adapted to assign a location to the at least one stay that is equivalent to the calculated center of the location set.

19. The device as recited in claim 14, wherein the locations of the multiple locations are analyzed in increasing chronological order and/or in decreasing chronological order.

20. The device as recited in claim 14, wherein the device is further adapted to apply to the extracted multiple stays a clustering operation in conjunction with a selected scale to produce multiple destinations.

21. The device as recited in claim 20, wherein the device is further adapted to effectuate and/or implement an application using the extracted multiple stays and/or the produced multiple destinations, the application selected from a group comprising: time-based patterns of behavior, location modeling and fusion, multi-object location interactions, destination statistics, and scale-dependent pattern analysis.

22. An arrangement for parsing location histories, the arrangement comprising:
temporal means for ascertaining candidate locations of a location history with a time window by applying the time window at a current location of the location history and ascertaining a next location that is outside the time window;
spatial means for instituting a roaming range for the candidate locations ascertained by the temporal means; and
extraction means for extracting stays from the location history using the temporal means and the spatial means.

23. The arrangement as recited in claim 22, wherein the spatial means institutes the roaming range by determining if a candidate location is within the roaming range with respect to a current location of the location history.

24. The arrangement as recited in claim 22, wherein the extraction means extracts a stay from the location history when a distance between a spatial location of a candidate location that is ascertained by the temporal means and a spatial location of a current location being analyzed is less than the roaming range instituted by the spatial means.

25. The arrangement as recited in claim 22, further comprising:
ascertainment means for ascertaining a location of the location history that is temporally most distant from a current location being analyzed but still within the roaming range instituted by the spatial means.

26. The arrangement as recited in claim 25, further comprising:
calculation means for calculating a center of a location set that is bounded by (i) the current location being analyzed and (ii) the most distant location as ascertained by the ascertainment means.

27. The arrangement as recited in claim 26, wherein the extraction means comprises:
location assignment means for assigning to an extracted stay a location responsive to the center of the location set as calculated by the calculation means;
start time assignment means for assigning to the extracted stay a start time responsive to a timestamp corresponding to the current location being analyzed; and
end time assignment means for assigning to the extracted stay an end time responsive to a timestamp corresponding to the most distant location as ascertained by the ascertainment means.

28. The arrangement as recited in claim 22, wherein the arrangement comprises at least one of (i) one or more processor-accessible storage media or (ii) at least one device.

29. One or more processor-accessible storage media comprising processor-executable instructions that, when executed, direct a device to perform actions comprising:
accepting raw location data as input, the raw location data including a plurality of location data points, each location data point of the plurality of location data points including a location and a corresponding timestamp; and
producing a plurality of destinations from the raw location data using a plurality of stays extracted from the raw location data, the plurality of stays associated with a temporal aspect of the raw location data.

30. The one or more processor-accessible storage media as recited in claim 29, wherein the action of producing comprises an action of:
applying a clustering operation to the plurality of stays in accordance with a scaling factor.

31. The one or more processor-accessible storage media as recited in claim 30, wherein each stay of the plurality of stays comprises a location, a starting time, and an ending time; and wherein each destination of the plurality of destinations comprises a location, and the plurality of destinations are associated with the scaling factor.

32. The one or more processor-accessible storage media as recited in claim 29, wherein the processor-executable instructions, when executed, direct the device to perform a further action comprising:
extracting the plurality of stays from the raw location data by enforcing a minimum stay duration for two or more location data points of the plurality of location data points to qualify as a stay.

33. The one or more processor-accessible storage media as recited in claim 29, wherein the processor-executable instructions, when executed, direct the device to perform a further action comprising:
effectuating and/or implementing an application using the plurality of stays and/or the plurality of destinations, the application selected from a group comprising: time-based patterns of behavior, location modeling and fusion, multi-object location interactions, destination statistics, and scale-dependent pattern analysis.

34. One or more processor-accessible storage media comprising processor-executable instructions that, when executed, direct a device to perform actions comprising:
accessing a plurality of stays, each stay of the plurality of stays comprising a location and a corresponding time period; and
clustering the plurality of stays to produce a plurality of destinations, the clustering comprising merging locations of the plurality of stays into a plurality of clusters in accordance with a scale setting.

35. The one or more processor-accessible storage media as recited in claim 34, wherein the action of clustering further comprises actions of:
creating respective destinations of the plurality of destinations from the plurality of clusters responsive to respective calculated centers of respective clusters of the plurality of clusters.

36. The one or more processor-accessible storage media as recited in claim 34, wherein the processor-executable instructions, when executed, direct the device to perform a further action comprising:
extracting the plurality of stays from a location history using a temporal threshold and a spatial threshold.

37. The one or more processor-accessible storage media as recited in claim 34, wherein the processor-executable instructions, when executed, direct the device to perform a further action comprising:
effectuating and/or implementing an application using the plurality of stays and/or the plurality of destinations, the application selected from a group comprising: time-based patterns of behavior, location modeling and fusion, multi-object location interactions, destination statistics, and scale-dependent pattern analysis.

* * * * *